Patented June 30, 1942

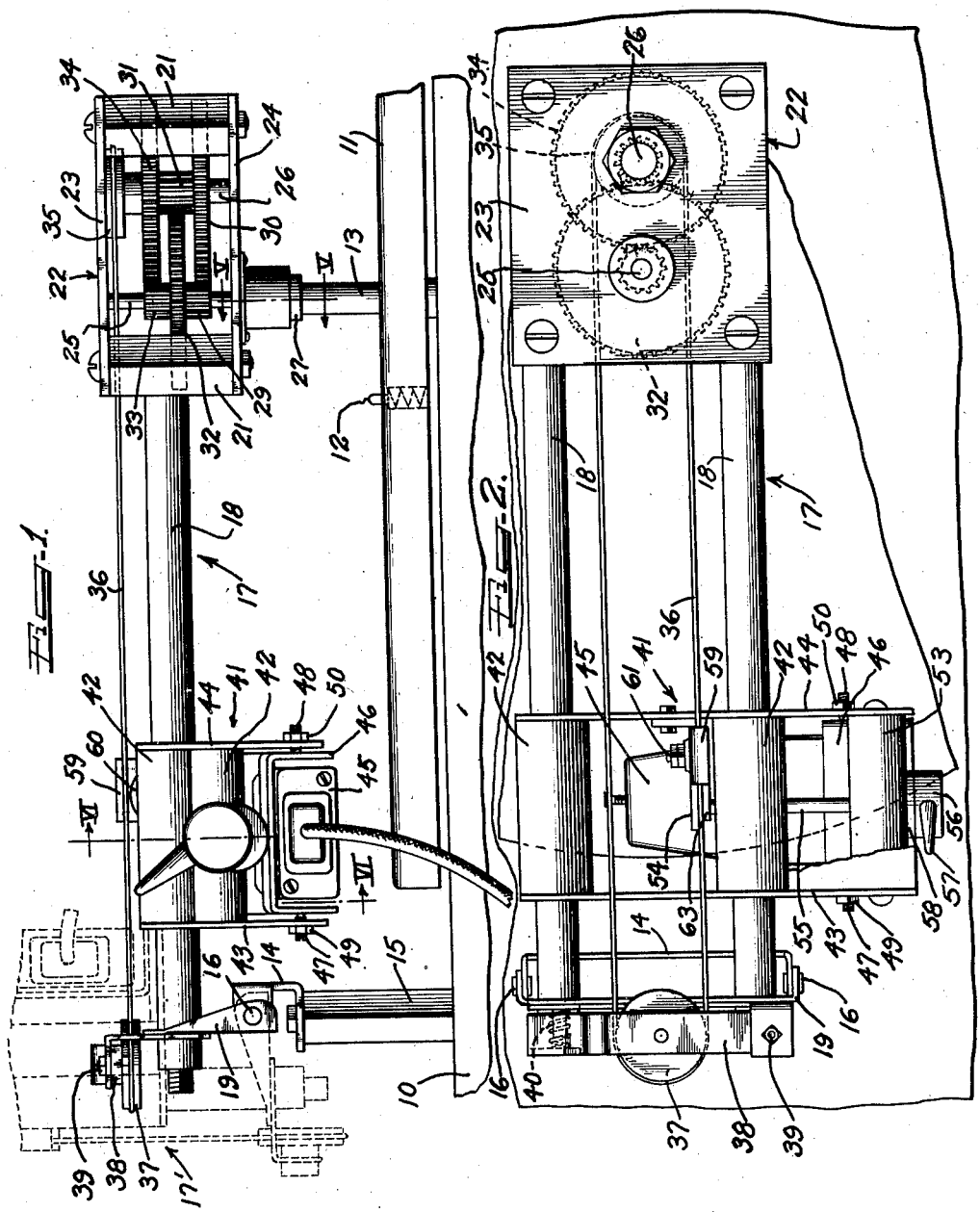

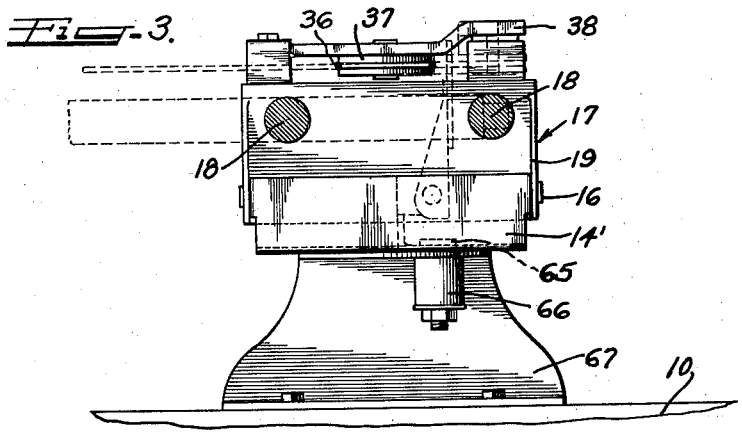
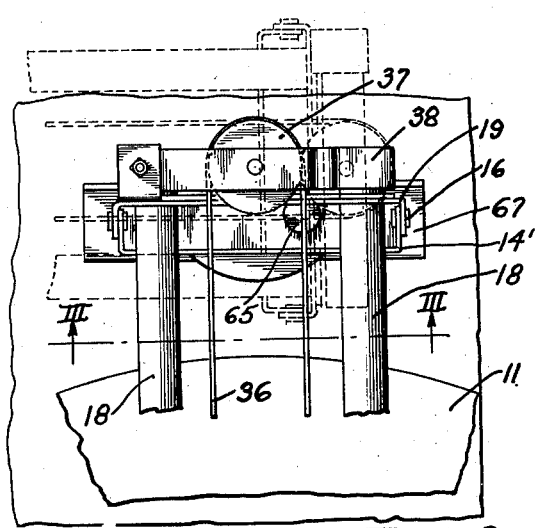
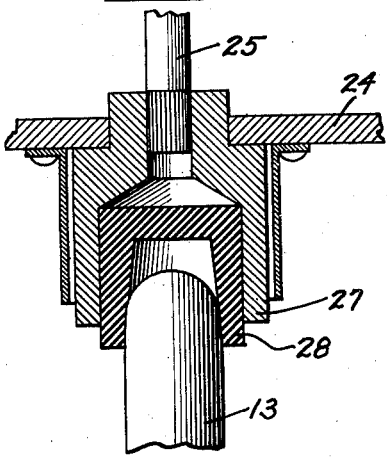
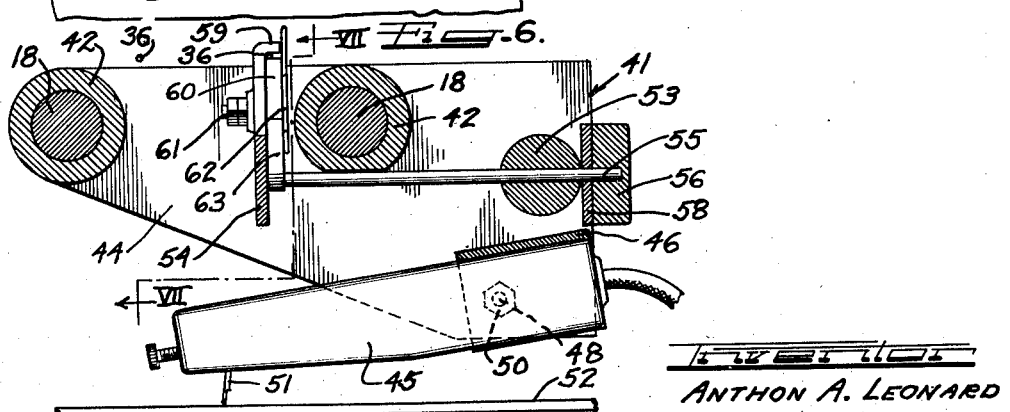

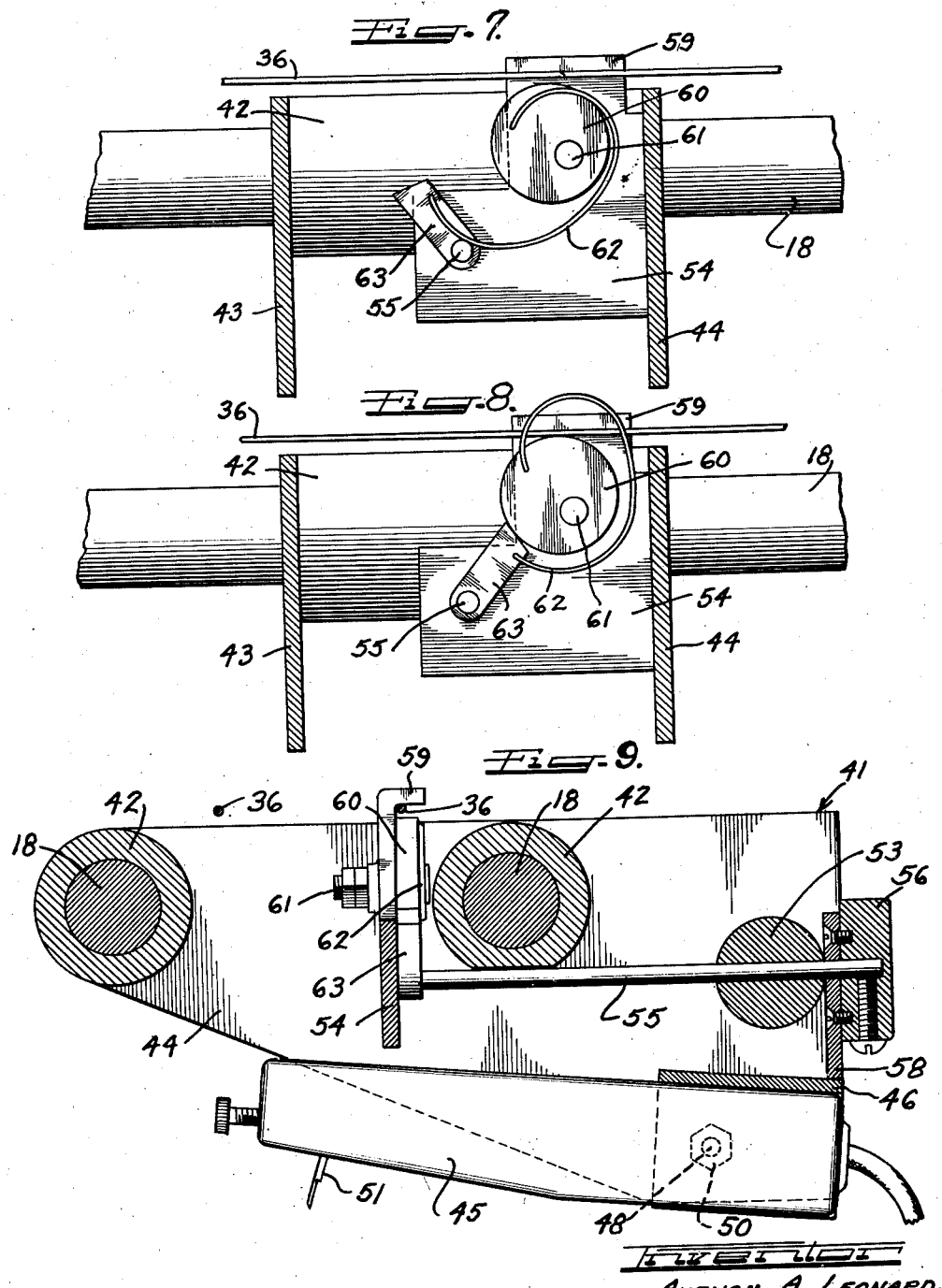

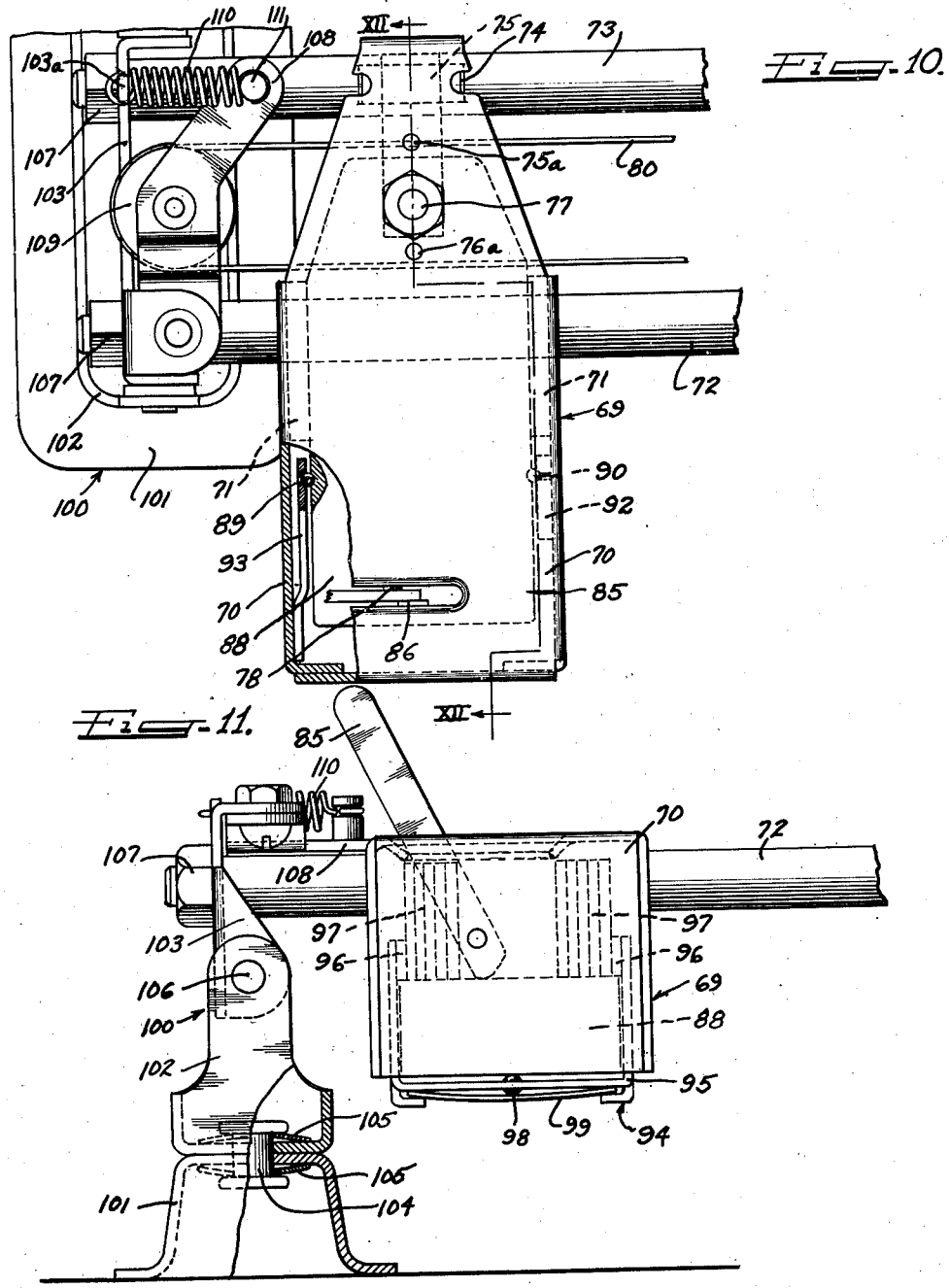

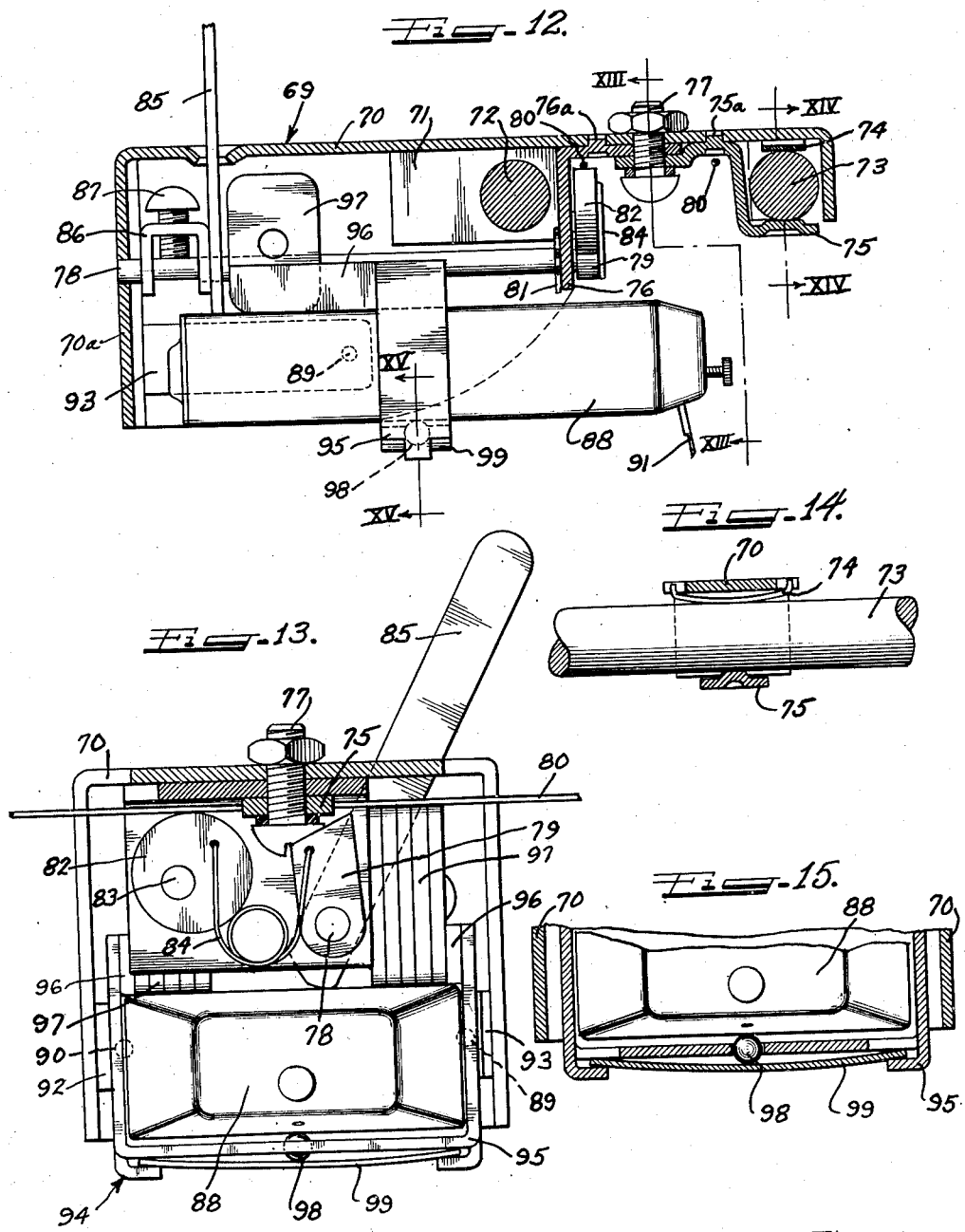

2,287,809

UNITED STATES PATENT OFFICE 2,287,809

PHONOGRAPH RECORD CUTTING MECHANISM

Anthon A. Leonard, Glenside, Pa., assignor to Heinze Electric Corporation, Lowell, Mass., a corporation of Michigan Application June 17, 1940, Serial No. 340,915

14 Claims. (Cl. 274—13)

This invention relates to machines for cutting phonograph records and particularly to machines of this class intended to be sold at a moderate price to the general public.

In cutting phonograph records, and particularly in cutting records in which the sound is reproduced by the sinousity or wave-like plan of the groove cut in the record rather than by the varying depth of the groove, it is extremely important that the feed of the cutting tool across the record be smooth and positive, without any lost motion, in order that the groove cut by the tool may faithfully reproduce the sound being recorded. In many record cutters that have been made, the feed of the cutter head across the record is accomplished by means of a screw, which, although theoretically a good means, in practice generally permits a small amount of lost motion. The lost motion, which is introduced by the necessary working clearance between the feed screw and the threads which it engages, permits a portion of the relative movement between the cutter head and the cutter tool to be absorbed by movement of the cutter head instead of all of the movement of the cutter tool being utilized in cutting the groove on the record, with the result that the record sound is distorted and reduced in volume.

One of the principal objects of the present invention is to provide a simple means of feeding the cutter head across the record without any lost motion whatsoever, so as to eliminate this fault of previous record cutters.

Another object of this invention is to provide a record-cutting mechanism comprising a cutter head and means for feeding it across a turntable that are located substantially entirely above the turntable so that the mechanism can be applied to existing phonograph turntables with very little change therein.

Another object of this invention is to provide a record cutting mechanism having a single means for lifting the cutter from the record and disconnecting the feed mechanism so that recordings may be stopped and started again at any point on the record with the greatest of ease. It is a further object to synchronize the lifting of the cutter head and the disconnecting of the cutter head from the feed mechanism in such a way that the lifting of the head occurs an instant before the disconnecting from the feed mechanism and the subsequent lowering of the head to start cutting again occurs after the feed mechanism is re-connected in order that there will be no cutting of one sound-track on top of another.

Another object of the invention is to provide an extremely simple means of stopping the feed of the cutter head when it reaches the limit of its travel.

These and other objects of the invention will be more fully apparent from the following description taken in connection with the accompanying drawings, in which:

Figure 1 is a front elevation of one of the preferred forms of the invention;

Figure 2 is a plan view of the form of the invention shown in Figure 1;

Figure 3 is a cross section, taken on the line III—III of Figure 4, showing a modification of a portion of the invention;

Figure 4 is a plan view of the portion of the modified form of the device shown in Figure 3;

Figure 5 is a cross section, on an enlarged scale, taken on the line V—V of Figure 1 and looking in the direction of the arrows;

Figure 6 is a cross section taken on the line VI—VI of Figure 1 and looking in the direction of the arrows;

Figures 7 and 8 are cross sections taken on the line VII—VII of Figure 6, these sections being on an enlarged scale and showing the parts in two different positions;

Figure 9 is a cross section similar to Figure 6, on an enlarged scale and showing the parts in a different position.

Figure 10 is a plan view, partly in section of a portion of another modification of the invention;

Figure 11 is an elevational view, partly in section of the form of the invention shown in Figure 10;

Figure 12 is a longitudinal section taken on the line XII—XII of Figure 10 and looking in the direction of the arrows;

Figure 13 is a cross section taken on the line XIII—XIII of Figure 12 and looking in the direction of the arrows;

Figure 14 is a cross section taken on the line XIV—XIV of Figure 12 and looking in the direction of the arrows; and Figure 15 is a cross section taken on the line XV—XV of Figure 12 and looking in the direction of the arrows.

The construction shown in Figures 1, 2, 5, 6, 7, 8 and 9 is mounted in a portion of a cabinet 10 which contains the mechanism (not shown) for rotating a turntable 11 at a uniform speed. This mechanism, including the turntable 11, may be similar to that in an ordinary phonograph with the exception that the turntable 11 is provided with a spring-urged record drive pin 12 adapted to fit in a drive hole in the record to be cut in order to provide a positive drive for the record, and the turntable spindle or shaft 13 projects up some distance above the turntable 11.

The record cutting mechanism proper is carried by a bracket 14 mounted on a pair of pillars 15 extending up beside the turntable. The bracket 14 carries horizontal pivots 16 upon which the cutter arm 17 is mounted, the cutter arm 17 being adapted to extend across the turntable 11 and be supported upon the turntable spindle 13 when in operation or to be swung up to the position shown by the dotted lines 17' in Figure 1 when it is desired to place a record on the turntable 11 or to remove it therefrom.

The cutter arm 17 comprises a pair of parallel support bars 18 secured at one end to a crosspiece 19 which forms the bearing for the cutter arm on the pivot 16. The other ends of the support bars 18 are secured to the pillars 21 of a gear box 22 forming the end of the cutter arm.

The gear box 22 is formed by top and bottom plates 23 and 24 joined by the pillars 21 and having holes in which a pair of upright shafts 25 and 26 are journaled. One upright shaft 25 projects through the lower gear box plate 24 and carries a coupling 27 adapted to engage and be turned by the turntable spindle 13.

The coupling 27 may be in the form of a metal cup having a transverse pin adapted to fit into a slot in the top of the turntable spindle 13 or, as shown in Figure 5, it may merely contain a friction member, such as the rubber cup 28, adapted to grip the upper end of the turntable spindle 13.

The shaft 25 has a pinion 29 fixed to it, the pinion 29 driving a gear 30 which is free to rotate on the other shaft 26. The gear 30 is made integral with another pinion 31 which engages a second gear 32 journaled on the first shaft 25. The second gear 32, in turn, is made integral with a pinion 33 which engages a third gear 34 fixed to the second shaft 26. This arrangement causes the shaft 26 to rotate at a small fraction of the speed of the shaft 25 which is driven directly from the turntable spindle 13.

The upper end of the slow speed shaft 26 carries a pulley 35 around which a cutter feed cable 36 extends. The other end of the cable 36 is carried by an idler pulley 37 mounted on an arm 38 at the other end of the cutter arm 17. The idler pulley arm 38 is carried by a pivot 39 at one end and is pressed outward at the other end by a spring 40 in order that the correct tension may be maintained at all times in the cable 36.

The cutter carriage 41, which is moved along the bars 18 of the cutter arm 17 by the feed cable 36, comprises a pair of sleeves 42 slidably mounted on the support bars 18 and having a pair of side frame plates 43 and 44 rigidly fixed to them. The cutter head 45 is secured in a holder 46 pivotally mounted at one end between the side plates 43 and 44 by a pair of screws 47 and 48 having pointed ends fitting into recesses in the sides of the holder 46. The screws 47 and 48 are provided with lock nuts 49 and 50 so that they can be adjusted to eliminate any lost motion and then locked in position.

The cutter head 45 is of standard construction and carries a cutting tool 51 adapted to rest upon a record 52, as shown in Figure 6, and cut a groove therein as the record moves below the cutter head. The cutter head 45 is supported by the pivots 47 and 48 near one end, and the cutting tool 51 is located near the other end, so that a portion of the weight of the cutter head 45 will be carried by the cutting tool 51. The parts are so proportioned that this results in exactly the correct pressure being applied to the cutting tool 51, thus making springs or other means for holding the cutting tool down unnecessary.

The cutter carriage 41 includes a front cross member 53 and a central bracket 54 in which a cutter control shaft 55 is journaled. The outer end of the shaft 55 carries an actuating knob 56 and lever 57 and a cutter head lifting cam 58. The cam 58 is located so that it can bear against the front edge of the cutter head holder 46, as shown in Figure 9, and is shaped so that, when it is rotated, it will press down on that edge of the holder 46 and swing up the other end of the cutter head 45, thus lifting the cutting tool 51 from the record 52.

The central bracket 54 in the cutter carriage 41 includes a horizontal lip 59 at the top that extends forward over one side of the cable 36. Below the lip 59, the bracket 54 carries a cam 60 on a stud 61 rotatably mounted in the bracket, the cam 60 being adapted to cooperate with the lip 59 to grip the cable 36 and cause the carriage 41 to move with the cable. The cam 60 is operated from the shaft 55 by means of a spring link 62 interconnecting the cam 60 and an arm 63 on the shaft 55, as shown in Figures 7 and 8.

The arm 63 is of such a length and is so located that, after the cam 60 has been moved up against the cable 36 by means of the link 62, the end of the arm 63 will bear against the edge of the cam 60 and cause it to grip the cable with the desired tightness. The arm 63 which operates the cable clamping cam 60 and the cutter head lifting cam 58 are fixed on the shaft 55 in such a relation to each other that, when the shaft 55 is turned in one direction, the cutting tool 51 is first lifted from the record by the action of the cutter head lifting cam 58 and thereafter the cable-gripping cam 60 operates to release the cable 36. When the shaft 55 is turned in the other direction, the reverse action takes place, the cable being gripped first and the cutter tool then being lowered upon the record. The spring link 62 is an important element in causing the parts to operate in this fashion, as it holds the cable-gripping cam 60 in gripping position while the shaft 55 is being rotated the amount necessary to raise or lower the cutting tool 51 out of or into cutting position.

It will be noted that no means has been provided for automatically disconnecting the cutter carriage 41 from the feed cable 36 when the carriage reaches the end of its travel. Such a means could be readily provided, but, unless additional mechanism is also provided, it introduces the danger that the cutter carriage and cutting tool might be accidentally moved back over the cut portion of the record. To avoid these difficulties and complications, the cable 36 is arranged to slip when the carriage 41 reaches the end of its travel against the end of the gear box 22, so that the carriage is held against any accidental reverse movement. The desired ability to slip may be provided where the cable is gripped between the cable-gripping cam 60 and the cooperating abutment 59 on the carriage, or it may be provided by making the spring 40, which acts on the idler 37 to keep the cable tight, of such a strength that the cable will slip on the drive pulley 35 when the carriage 41 is stopped.

A modification of a portion of the invention is illustrated in Figures 3 and 4. In this modification, the crosspiece 19 of the cutter arm 17 is secured by horizontal pivots 16 to a bracket 14' which, instead of being fixed to the fixed table 10, is arranged to swing around in a horizontal plane. This movement is provided for by a vertical pivot 65 journaled in a bearing 66 carried by a standard 67 fixed to the table 10. With this arrangement, the cutter arm 17 not only can be swung up to permit changing of records, but it can also be swung around to the side to the position shown in dotted lines in Figures 3 and 4, to enable the turntable 11 to be used in connection with a tone arm for playing records without having the cutter arm 17 projecting up and possibly being in the way.

Another form of the invention, designed particularly for commercial production is illustrated in Figures 10 to 15. In this form of the invention, the cutter carriage 69 comprises a box-like sheet-metal frame 70 having a pair of reinforcing pieces or bearings 71 welded to its sides where the rear support bar or track 72 extends through the carriage. The front support bar or track 73 passes through the nose of the carriage 69 and is slidably but firmly held between the under side of a leaf spring 74 and the top of a boss on an arm 75 forming a part of the cutter carriage. Both the arm 75 and a transverse wall 76 are fixed to the main portion of the cutter carriage frame 70 by a bolt 77 and are prevented from swinging around on the bolt 77 by bosses 75a and 76a that fit into holes in the top of the frame 70.

The back wall 70a and the transverse wall 76 of the cutter carriage are formed with aligned bearings in which the cutter control shaft 78 is journaled. The front end of the shaft 78 is provided with a cable control arm 79 forced on or otherwise secured to it and located just ahead of the transverse wall 76. Immediately behind the transverse wall 76, the shaft 78 is formed with a circumferential groove receiving a spring wire clip 81. Thus the shaft 78 is held against rearward movement by the arm 79 and against forward movement by the clip 81.

The transverse wall 76 carries a cable gripping cam 82 mounted on a pivot 83 and connected to the cable control arm 79 by a spring link 84. The spring link 84 and the arm 79 together form a resilient toggle which snaps over center after the cam 82 grips the cable 80 and keeps the parts in cable gripping position while allowing them to be readily moved to the position in which the cable is released.

The cutter control shaft 78 is operated by a lever 85 secured to it near the back of the cutter carriage and projecting up through a slot in the top of the carriage. The lever 85 is welded to one side of a stirrup 86 having noncircular holes through which the shaft 78 extends and having a set screw 87 for forcing the shaft against the flat sides of these holes, the shaft itself having a flat place upon which the flat portion of the holes in the stirrup 86 may seat. The lower end of the lever 85 is formed into a cam shape to bear upon the upper surface of the cutter head 88 at a point in back of the pivots 89 and 90 so that it will lift the front end of the cutter head 88 up and lift the cutting tool 91 out of engagement with the record.

The pivots 89 and 90 which carry the cutter head 88 are a pair of steel balls fitting into recesses in the sides of the cutter head. On one side, the steel ball 90 seats in the mouth of a hole drilled in a bearing block 92 welded to the side of the frame 70, and, on the other side, the steel ball 89 seats in the mouth of a hole drilled in a resilient bearing arm 93 near one end, the other end of the arm 93 being welded to the frame 70. With this construction, the resiliency of the bearing arm 93 causes both of the bearings 89 and 90 to seat solidly in their supports 92 and 93 and in the sides of the cutter head 88 so that there will be no lost motion whatsoever in the bearings.

The cutter head 88 is provided with a pressure regulator 94 comprising a yoke 95 fitting around under and up at each side of the cutter head 88 ahead of the bearings 89 and 90, a pair of arms 96 welded to the upper ends of the yoke 95 extending back on top of the cutter head 88, and a pair of weights 97 welded to the rear ends of the arms 96 and resting on the top of the cutter head 88 behind the pivots 89 and 90. The weights 97 may be formed in any suitable manner, the particular construction shown comprising a plurality of laminations riveted together and having the outer laminations welded to the arms 96 before the other laminations are riveted to it.

The pressure regulator 94 is shifted forward or backward on the cutter head 88 in order to counterbalance more or less of the weight of the cutter head 88 and thus vary the portion of the weight of the cutter head 88 which is carried by the cutting tool 91. The pressure regulator 94 is frictionally held in any desired adjusted position by means of a ball 98 which fits loosely in a hole in the bottom of the yoke 95 and is pressed up against the bottom of the cutter head 88 by a leaf spring 99 carried by the yoke 95.

At their outer ends, the support bars or tracks 72 and 73 are secured to a gear box which is generally similar to the gear box 22 shown in Figures 1 and 2 and drives the cable 80 in substantially the same way. At their inner ends the support bars 72 and 73 are secured to a swivel bracket 100 shown in Figures 10 and 11. The bracket 100 comprises a lower stamping 101 forming a base, an intermediate stamping 102 having a flat bottom resting upon the top of the base 101 and pivoted thereto so as to be able to swing about a vertical axis, and an upper stamping 103 pivoted to the intermediate stamping 102 so as to be able to swing about a horizontal axis. The pivotal connection between the lower and the intermediate stampings 101 and 102 comprises a rivet 104 extending through the superposed portions of the two stampings 101 and 102 and a pair of Belleville washers located between the heads of the rivet 104 and the bearing portions of the stampings 101 and 102. The upper stamping 103 is pivoted to the lower stamping 102 by a shaft 106 extending through them and secured against endwise movement by clips similar to the clip 81 on the cutter control shaft.

The upper stamping 103 has the support bars 72 and 73 extending through it and secured thereto by nuts 107, and it also carries a swinging arm 108 upon which the idler pulley 109 for the cable or belt 80 is mounted. The proper tension in the cable 80 is assured by a tension spring 110 extending between an upstanding lug 103a on the upper portion 103 of the swivel bracket 100 and a stud 111 on the idler pulley arm 109.

From the above it will be seen that I have provided a simple and economically constructed device for carrying the cutter head 88 and cutting tool 91 in a straight line across the record to be cut and that it is so arranged to minimize the possibility of one sound groove being cut over another. It will also be seen that I have provided a construction in which there is practically no possibility of lost motion in the feed mechanism, this being especially important in a record cutter which cuts a side-to-side groove.

While I have shown only a few embodiments of my invention, it will, of course, be understood that I do not wish to be limited thereto, as many other modifications or embodiments may be made, and I therefore contemplate by the appended claims to cover all such modifications as fall within the true spirit and scope of my invention.

I claim as my invention:

1. In a phonograph record cutter including means for supporting and rotating a record, a guide means extending transversely above said record supporting means, a cutter carriage movably mounted on said guide means, a cutter head carried by said carriage and carrying a cutting tool adapted to rest upon and cut a record carried by said record supporting means, a feed cable movably mounted adjacent said guide means, and means operatively connected to said record rotating means for moving said cable, means on said carriage for lifting said cutting tool from said record, and releasable means on and for clamping said cable to said carriage, the improvement comprising means operatively connecting said lifting and clamping means for successively operating said lifting means to lift said cutting tool and for thereafter releasing said clamping means.

2. In a phonograph record cutter including means for supporting and rotating a record, a guide means extending transversely above said record supporting means, a cutter carriage movably mounted on said guide means, a cutter head carried by said carriage and carrying a cutting tool adapted to rest upon and cut a record carried by said record supporting means, a feed cable movably mounted adjacent said guide means, means operatively connected to said record rotating means for moving said cable, means on said carriage for lifting said cutting tool from said record, releasable means on and for clamping said cable to said carriage, and a control member directly connected to said lifting means, the improvement comprising a lost motion connection between said control member and said clamping means for releasing said clamping means after the operation of said lifting means.

3. In a phonograph record cutter including means for supporting and rotating a record, a guide means extending transversely above said record supporting means, a cutter carriage movably mounted on said guide means, a cutter head carried by said carriage and carrying a cutting tool adapted to rest upon and cut a record carried by said record supporting means, a feed cable movably mounted adjacent said guide means, means operatively connected to said record rotating means for moving said cable, means on said carriage for lifting said cutting tool from said record, releasable means on and for clamping said cable to said carriage, and a control member directly connected to said lifting means, the improvement comprising a resilient lost motion connection between said control member and said clamping means for releasing said clamping means after the operation of said lifting means.

4. In a phonograph record cutter including means for supporting and rotating a record, a guide means extending transversely above said record supporting means, a cutter carriage movably mounted on said guide means, a cutter head carried by said carriage and carrying a cutting tool adapted to rest upon and cut a record carried by said record supporting means, a feed cable movably mounted adjacent said guide means, means operatively connected to said record rotating means for moving said cable, means on said carriage for lifting said cutting tool from said record, releasable means on and for clamping said cable to said carriage, and a control member directly connected to said lifting means, the improvement comprising a spring link between said control member and said clamping means for holding said clamping means tight against said cable until after said cutting tool is lifted from said record upon movement of said control member in one direction and for applying said gripping means to said cable before said cutting tool is lowered to said record upon movement of said control member in the other direction.

5. In a phonograph record cutter, a cutting tool, means for feeding the cutting tool including a connecting means movable to and away from an operative position, a rotatable control shaft, means operated by rotation of said control shaft for raising and lowering said cutting tool, an arm member on said shaft, and a link member joining said arm to said connecting means, one of said members being resilient and said members forming a resilient toggle constructed and arranged to move said connecting means to said operative position before said cutting tool is lowered to the record to be cut.

6. In a phonograph record cutter, a cutting tool, means for feeding the cutting tool including a connecting means movable to and away from an operative position, a control shaft rotatable about its longitudinal axis, means operated by rotation of said control shaft for raising and lowering said cutting tool, an arm member on said shaft, and a link member joining said arm to said connecting means, one of said members being resilient and said members forming a resilient toggle constructed and arranged to move said connecting means to said operative position before said cutting tool is lowered to the record to be cut, said toggle being provided with means for stopping motion thereof beyond dead center, the resiliency of said toggle permitting movement thereof beyond dead center and holding said toggle against said stopping means.

7. In a phonograph record cutter, a cutter carriage, means disposed in a horizontal plane for slidably supporting said carriage above a record to be cut, a cutter head pivotally supported at spaced points by said carriage and carrying a cutting tool adapted to rest on said record, a feed cable movably mounted adjacent said supporting means, a cable gripping member pivotally mounted in said carriage, a control shaft journaled in said carriage, an arm on said shaft, and a resilient curved link connecting said arm to said gripping member.

8. In a phonograph record cutter, a cutter carriage, means disposed in a horizontal plane for slidably supporting said carriage above a record to be cut, a cutter head pivotally supported at spaced points along an axis angularly disposed from its longitudinal axis by said carriage and carrying a cutting tool adapted to rest on said record, a feed cable movably mounted adjacent said supporting means, a cable gripping member pivotally mounted in said carriage, a control shaft journaled in said carriage, a cam fixed on said shaft and constructed and arranged to swing said cutter head and lift said cutting tool when said shaft is rotated, an arm on said shaft, and a resilient curved link connecting said arm to said gripping member, said link being constructed and arranged to move said gripping member into gripping position before said cutting tool is lowered to said record, and the resiliency of said link permitting said shaft to continue to be turned until said cutting tool is lowered to said record.

9. In a phonograph record cutter, a cutter carriage, a feed cable, disengageable frictional means for connecting said carriage to said cable, frictional means engaging said cable for causing movement thereof, and spring means for controlling the pressure of one of said frictional means on said cable, said spring means being constructed and arranged to permit slippage of said cable when said carriage reaches the limit of its travel.

10. In a phonograph record cutter, a cutter carriage slidably supported in a horizontal plane, rotatable pulley members mounted on vertical axes, a feed cable carried by said pulley members and extending along the path of said carriage, and cable clamping means on said carriage including a clamping member rotatable about a horizontal axis and having a cable-engaging surface parallel thereto, said cable being round in cross section and thereby adapted to cooperate with all of said members.

11. In a phonograph record cutter, a pair of support bars, a cutter carriage having spaced bearings encircling and slidable on one of said support bars, said carriage also having rigid means for slidably engaging the other of said support bars on one side, and resilient means on said carriage for slidably engaging the other of said support bars on the other side.

12. In a phonograph record cutter, a cutter carriage slidably supported in a horizontal plane transversely across and above a record to be cut, rotatable pulley members mounted on vertical axes, an endless feed cable carried by said pulley members and extending along the path of said carriage, an arm pivotally mounted at one end and carrying one of said pulley members on an intermediate portion thereof, spring means connected to and between a support and the other end of said arm, said spring means exerting a pull on said arm in opposition to the pull of said feed cable on the pulley, and means on and for clamping said cable to said carriage.

13. In a phonograph record cutter, a cutter carriage slidably supported in a horizontal plane, a cutting tool pivotally connected to said carriage, an endless cable movably mounted adjacent the path of movement of said cutter carriage, cam means pivotally mounted on said carriage for rotation to clamp said cable to said carriage, additional cam means pivotally mounted on said carriage in spaced offset relation from said first cam means, said additional cam means being arranged for rotation for lifting and lowering said cutting tool about its pivotal connection to said carriage, a shaft extending from said additional cam means and terminating in spaced relation from said first cam means, an arm on the terminal of said shaft, and a spring link member connecting said arm and said first cam means whereby said first cam means is rotated in lagging relation to said additional cam means.

14. In a phonograph record cutter, a base bracket having a flat top portion, an intermediate bracket having a flat bottom portion and spaced legs at its top, a headed pivot pin connecting said flat portions, a resilient washer between each head on said pivot pin and the adjacent flat portion of the respective brackets, a support bracket having legs pivotally connected between the spaced legs of said intermediate bracket, guide bars connected to said support bracket, and a carriage having a cutting tool slidably mounted on said guide bars.

ANTHON A. LEONARD.